Aug. 31, 1965     E. L. ZADRA     3,203,158
AIR CLEANER AIR INLET SCREEN
Filed Jan. 4, 1963
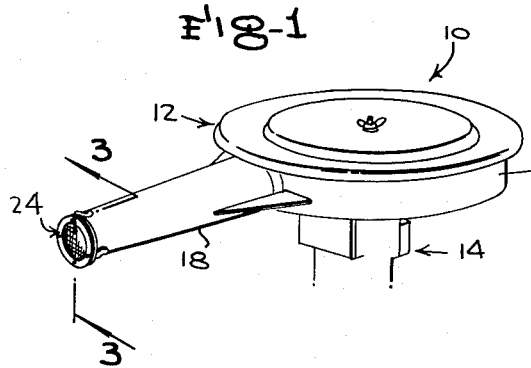
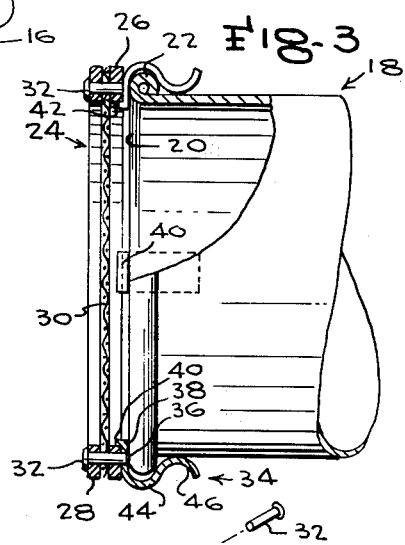
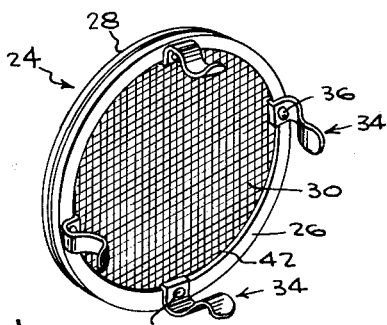
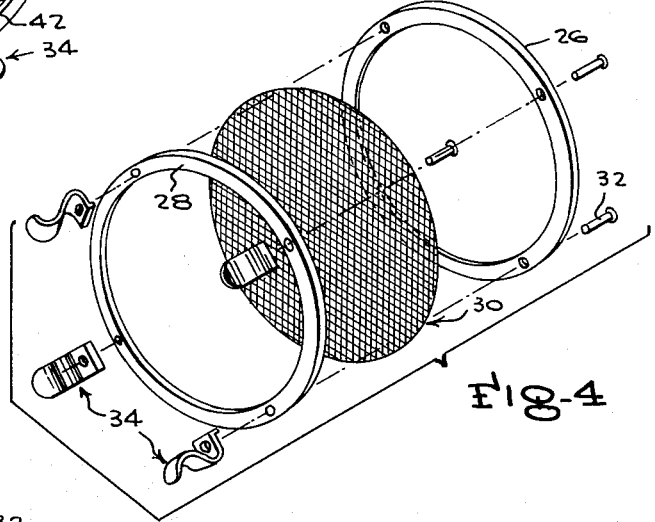
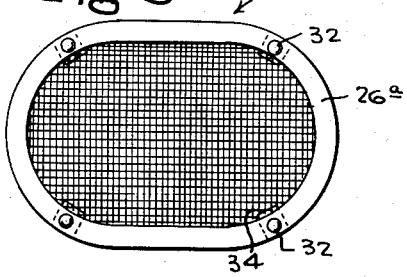
INVENTOR.
EDWIN L. ZADRA
BY
McMorrow, Berman & Davidson
ATTORNEYS

United States Patent Office 3,203,158
Patented Aug. 31, 1965

3,203,158
AIR CLEANER AIR INLET SCREEN
Edwin L. Zadra, 1750 W. Mosier Place, Apt. 21,
Denver, Colo.
Filed Jan. 4, 1963, Ser. No. 249,493
4 Claims. (Cl. 55—505)

This invention relates to a novel internal combustion engine carburetor air cleaner air inlet screen.

The primary object of the invention is the provision of an efficient, simple, and inexpensive device of the kind indicated, which prevents the entrance into the air cleaner, and hence into the associated carburetor and engine manifold of foreign particles, including bugs, which otherwise tend to reduce the useful life of the air cleaner's filter element and necessitate frequent cleaning thereof, and clog and damage the carburetor and/or engine manifold and internal parts of the engine.

Other important objects and advantageous features of the invention will be apparent from the following description and the accompanying drawings, wherein, for purposes of illustration only, specific forms of the invention are set forth in detail.

In the drawings:

FIGURE 1 is a perspective view of a carburetor air cleaner having a screen in accordance with the present invention;

FIGURE 2 is an enlarged perspective view of the air cleaner inlet screen, per se;

FIGURE 3 is an enlarged vertical longitudinal section taken on the line 3—3 of FIGURE 1, parts being broken away and in section;

FIGURE 4 is an exploded perspective view of the screen;

FIGURE 5 is a perspective view of another form of screen of the present invention.

Referring in detail to the drawings, wherein like numerals designate like parts throughout the several views, the illustrated device, generally designated 10, comprises a flat cylindrical casing 12, adapted to be mounted on the upper end of an internal combustion engine carburetor 14. The casing 12 has a sidewall 16 from which extends a horizontal radial ram air intake tube 18, which communicates with the interior of the casing and has an open outer end 20, around which an external bead 22 extends.

In accordance with the present invention, the outer end 20 of the ram air intake tube 18 is covered to a screen assembly 24 which while passing air into the tube, due to forward motion of the vehicle with which the device is associated, prevents the passage thereinto of injurious foreign objects, including bugs.

The screen assembly 24 comprises a pair of similar flat inner and outer rings 26 and 28, respectively, which are registered with each other, and which, when the outer end of the ram air intake tube 18 is circular or cylindrical, are cylindrical in shape. A screen 30, of a diameter substantially equal to the outside diameters of the rings is positioned between and clamped between the rings, which are clamped to the screen and held in concentric registered relationship, by means of headed rivets 32, extending through the rings and through the screen 30.

The inner ring 26 has spring clips 34 spaced circumferentially therearound, which are secured against the inner side of the inner ring by the inner heads 36 of the rivets 32. The clips comprise flat bases 38 which bear against the inner side of the inner ring 26 and terminate, at its radially inward ends, in flanges 40 which are engaged with the radially inward edge 42 of the inner ring. The radially outward ends of the bases 38 merge into arcuate hook portions 44 which are dimensioned to grip the outer side of the ram air tube bead 22, as shown in FIGURE 3. The hook portions 44 terminate in oppositely curved terminals 46, which serve as cams for snapping the clips over the bead 22, and as handles which facilitate removal of the clips from the bead 22.

It is intended that the present invention apply to the screening of air cleaner intakes other than ram air intake tubes, and to the screening of ram air tubes of other than cylindrical form. As an example of this, FIGURE 5 of the drawings shows an oval screen assembly 24ª otherwise of the same construction as the screen assembly 24 of FIGURES 1 through 4.

Although there have been shown and described preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, an intake conduit having an outer end, a screen assembly extending across said outer end and secured to the conduit, said outer end having an external bead extending therearound, said screen assembly comprising inner and outer registered rings, a screen extending across the openings of the rings and having a peripheral portion clamped between the rings, spring clips non-rotatably fixed to said inner ring and engaged over said bead, headed rivets extending through and holding said rings, said peripheral portion and said clips in fixed, assembled relationship, said clips having bases engaged with the inward side of the inner ring, said rivets having inner heads engaged with the inner sides of the bases, said bases having lateral flanges on their inward ends engaged with the radially inward edge of the inner ring.

2. In combination, an intake conduit having an outer end, a screen assembly extending across said outer end and secured to the conduit, said outer end having an external bead extending therearound, said screen assembly comprising inner and outer registered rings, a screen extending across the openings of the rings and having a peripheral portion clamped between the rings, spring clips non-rotatably fixed to said inner ring and engaged over said bead, headed rivets extending through and holding said rings, said peripheral portion and said clips in fixed, assembled relationship, said clips having bases engaged with the inward side of the inner ring, said rivets having inner heads engaged with the inner sides of the bases, said bases having lateral flanges on their inward ends engaged with the radially inward edge of the inner ring, said bases merging at their outer ends into curved hooks snapped over the bead, said hooks merging into oppositely curved cam terminals which facilities passing the hooks over the bead and removing the hooks from the bead.

3. A screen assembly for an air intake conduit, said screen assembly comprising registered outer and inner rings, said inner ring being adapted to bear against the conduit around its opening, spring clips secured to said inner ring and frictionally embracing the conduit, a screen extending across the openings of the rings and having a peripheral portion engaged between the rings, and fasteners extending through the rings and said peripheral portion of the screen and assembling the screen and the rings together, said fasteners extending also through the clips and fixing the clips to the inner ring, said clips having bases engaged with the inner surface of the inner ring through which the fasteners extend, said bases having lateral flanges engaged with the radially inward edge of the inner ring.

4. In combination, an internal combustion engine carburetor air cleaner comprising a ram air intake tube having an intake end, said ram tube being formed with an annular external bead at said intake end, ring means larger in external diameter than the bore of the ram tube, said ring means bearing against the intake end of the ram tube, a screen secured across said ring means, and circumferentially-spaced spring clips non-rotatably secured to said rings means and snapped over said head, said spring clips having lateral flat bases which bear against one side of the ring means, and fastener means traversing said bases and the ring means, said bases having lateral flanges which are engaged with the inner edge of the ring means.

References Cited by the Examiner

UNITED STATES PATENTS

| | | | |
|---|---|---|---|
| 938,274 | 10/09 | Richardson | 210—460 |
| 1,069,394 | 8/13 | Cozzolino | 55—501 |
| 1,090,026 | 3/14 | Chillis | 55—493 |
| 1,215,974 | 2/17 | Orem. | |
| 1,464,237 | 8/23 | Beyer | 220—60 |
| 1,604,470 | 10/26 | Newnham | 55—507 |
| 1,828,816 | 10/31 | Pierson. | |
| 2,010,708 | 8/35 | Adams | 55—507 |
| 2,570,623 | 10/51 | Wistor | 55—482 |
| 3,086,674 | 4/63 | Scheuerman | 220—60 |

FOREIGN PATENTS 173,005   11/52   Austria.

HARRY B. THORNTON, *Primary Examiner.*